US010539222B2

(12) United States Patent
McCune et al.

(10) Patent No.: US 10,539,222 B2
(45) Date of Patent: *Jan. 21, 2020

(54) FLEXIBLE SUPPORT STRUCTURE FOR A GEARED ARCHITECTURE GAS TURBINE ENGINE

(71) Applicant: United Technologies Corporation, Farmington, CT (US)

(72) Inventors: Michael E. McCune, Colchester, CT (US); Jason Husband, South Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 811 days.

This patent is subject to a terminal disclaimer.

(21) Appl. No.: 15/185,292

(22) Filed: Jun. 17, 2016

(65) Prior Publication Data

US 2016/0319829 A1 Nov. 3, 2016

Related U.S. Application Data

(63) Continuation of application No. 13/938,466, filed on Jul. 10, 2013, now Pat. No. 9,410,608, which is a (Continued)

(51) Int. Cl.
*F02C 7/36* (2006.01)
*F16H 57/028* (2012.01)
(Continued)

(52) U.S. Cl.
CPC ......... *F16H 57/028* (2013.01); *F01D 25/164* (2013.01); *F02C 7/36* (2013.01);
(Continued)

(58) Field of Classification Search
CPC .... F02C 7/20; F02C 7/36; F01D 15/12; F01D 25/164; F05D 2260/40311
See application file for complete search history.

(56) References Cited

U.S. PATENT DOCUMENTS

| 2,936,655 A | 5/1960 | Peterson et al. |
| 3,021,731 A | 2/1962 | Stoeckicht |

(Continued)

FOREIGN PATENT DOCUMENTS

| CA | 2789325 | 4/2013 |
| CA | 2789465 | 4/2013 |

(Continued)

OTHER PUBLICATIONS

EP Search Report for EP Application No. 18191333.6 dated Mar. 7, 2019.
EP Search Report for EP Application No. 18191325.2 dated Mar. 7, 2019.
Kiekbusch, "A common formula for the combined torsional mesh stiffness of spur gears", 2007, 5th Australasian Congress on Applied Mechanics, ACAM 2007 (Year 2007).
(Continued)

*Primary Examiner* — Justin D Seabe
(74) *Attorney, Agent, or Firm* — Carlson, Gaskey & Olds, P.C.

(57) ABSTRACT

A geared architecture for a gas turbine engine includes a fan shaft and a frame which supports said fan shaft. The frame defines a frame stiffness. A plurality of gears drives the fan shaft and includes a gear mesh that defines a gear mesh stiffness. A stiffness of a ring gear of the plurality of gears is less than about 20% of the gear mesh stiffness. A flexible support supports the geared architecture and defines a flexible support stiffness. An input coupling to the plurality of gears defines an input coupling stiffness. The flexible support stiffness and the input coupling stiffness are each less than about 11% of the frame stiffness.

26 Claims, 8 Drawing Sheets

Related U.S. Application Data continuation of application No. 13/623,309, filed on Sep. 20, 2012, now Pat. No. 9,133,729, which is a continuation-in-part of application No. 13/342,508, filed on Jan. 3, 2012, now Pat. No. 8,297,916.

(60) Provisional application No. 61/494,453, filed on Jun. 8, 2011.

(51) Int. Cl.

| | | |
|---|---|---|
| *F01D 25/16* | (2006.01) | |
| *F02K 3/06* | (2006.01) | |
| *F04D 25/02* | (2006.01) | |
| *F04D 29/053* | (2006.01) | |
| *F04D 29/056* | (2006.01) | |
| *F16H 1/28* | (2006.01) | |

(52) U.S. Cl.
CPC ............... *F02K 3/06* (2013.01); *F04D 25/028* (2013.01); *F04D 29/053* (2013.01); *F04D 29/056* (2013.01); *F16H 1/28* (2013.01); *F05D 2220/323* (2013.01); *F05D 2260/40311* (2013.01); *F05D 2300/501* (2013.01)

(56) References Cited

U.S. PATENT DOCUMENTS

| | | | |
|---|---|---|---|
| 3,287,906 A | | 11/1966 | McCormick |
| 3,352,178 A | | 11/1967 | Lindgren et al. |
| 3,754,484 A | | 8/1973 | Roberts |
| 3,892,358 A | | 7/1975 | Gisslen |
| 4,084,861 A | * | 4/1978 | Greenberg ............ F01D 25/164 384/105 |
| 4,090,416 A | | 5/1978 | Hicks |
| 4,130,872 A | | 12/1978 | Harloff |
| 4,201,513 A | | 5/1980 | Sales |
| 4,221,114 A | | 9/1980 | Wilde et al. |
| 4,275,557 A | | 6/1981 | Marvin et al. |
| 4,289,360 A | | 9/1981 | Zirin |
| 4,825,644 A | | 5/1989 | Bubello |
| 4,825,723 A | | 5/1989 | Martin |
| 5,361,580 A | | 11/1994 | Ciokajlo et al. |
| 5,433,674 A | | 7/1995 | Sheridan et al. |
| 5,447,411 A | | 9/1995 | Curley et al. |
| 5,486,553 A | | 1/1996 | Deaner et al. |
| 5,524,847 A | | 6/1996 | Brodell et al. |
| 5,539,027 A | | 7/1996 | Deaner et al. |
| 5,778,659 A | | 7/1998 | Duesler et al. |
| 5,857,836 A | | 1/1999 | Stickler et al. |
| 5,915,917 A | | 6/1999 | Eveker et al. |
| 5,975,841 A | | 11/1999 | Lindemuth et al. |
| 6,073,439 A | | 6/2000 | Beaven et al. |
| 6,223,616 B1 | | 5/2001 | Sheridan |
| 6,260,351 B1 | | 7/2001 | Delano |
| 6,318,070 B1 | | 11/2001 | Rey et al. |
| 6,647,707 B2 | | 11/2003 | Dev |
| 6,663,530 B2 | | 12/2003 | Poulin et al. |
| 6,735,954 B2 | | 5/2004 | MacFarlane et al. |
| 6,814,541 B2 | | 11/2004 | Evans et al. |
| 6,855,089 B2 | | 2/2005 | Poulin et al. |
| 6,895,741 B2 | | 5/2005 | Rago et al. |
| 7,021,042 B2 | | 4/2006 | Law |
| 7,104,918 B2 | | 9/2006 | Mitrovic |
| 7,144,349 B2 | | 12/2006 | Mitrovic |
| 7,223,197 B2 | | 5/2007 | Poulin et al. |
| 7,393,182 B2 | | 7/2008 | Matheny |
| 7,451,592 B2 | | 11/2008 | Taylor et al. |
| 7,591,754 B2 | | 9/2009 | Duong et al. |
| 7,631,484 B2 | | 12/2009 | Giffin et al. |
| 7,665,293 B2 | | 2/2010 | Wilson et al. |
| 7,704,178 B2 | | 4/2010 | Sheridan |
| 7,824,305 B2 | | 11/2010 | Duong et al. |
| 7,828,682 B2 | | 11/2010 | Smook |
| 7,841,163 B2 | | 11/2010 | Welch et al. |
| 7,841,165 B2 | | 11/2010 | Orlando |
| 7,926,260 B2 | | 4/2011 | Sheridan et al. |
| 7,959,532 B2 | | 6/2011 | Suciu et al. |
| 8,001,763 B2 | | 8/2011 | Grabowski et al. |
| 8,172,717 B2 | | 5/2012 | Lopez et al. |
| 8,205,432 B2 | | 6/2012 | Sheridan |
| 8,297,916 B1 | | 10/2012 | McCune et al. |
| 8,640,336 B2 | | 2/2014 | Sheridan et al. |
| 9,133,729 B1 | | 9/2015 | McCune et al. |
| 9,239,012 B2 | | 1/2016 | McCune et al. |
| 9,297,917 B2 | | 3/2016 | Mah et al. |
| 9,523,422 B2 | | 12/2016 | McCune et al. |
| 9,631,558 B2 | | 4/2017 | McCune et al. |
| 9,752,511 B2 | | 9/2017 | McCune et al. |
| 2007/0214795 A1 | | 9/2007 | Cooker et al. |
| 2007/0225111 A1 | | 9/2007 | Duong et al. |
| 2007/0265133 A1 | | 11/2007 | Smook |
| 2008/0044276 A1 | | 2/2008 | McCune |
| 2008/0097813 A1 | | 4/2008 | Orlando et al. |
| 2008/0098713 A1 | | 5/2008 | Orlando et al. |
| 2009/0056306 A1 | | 3/2009 | Suciu et al. |
| 2009/0074565 A1 | | 3/2009 | Suciu et al. |
| 2009/0090096 A1 | | 4/2009 | Sheridan |
| 2009/0151317 A1 | | 6/2009 | Norris et al. |
| 2009/0183512 A1 | | 7/2009 | Suciu et al. |
| 2009/0314881 A1 | | 12/2009 | Suciu et al. |
| 2010/0105516 A1 | | 4/2010 | Sheridan et al. |
| 2010/0148396 A1 | | 6/2010 | Xie et al. |
| 2010/0331139 A1 | | 12/2010 | McCune |
| 2011/0106510 A1 | | 5/2011 | Poon |
| 2011/0116510 A1 | | 5/2011 | Breslin et al. |
| 2011/0130246 A1 | | 6/2011 | McCune et al. |
| 2011/0165983 A1 | | 7/2011 | Fox |
| 2011/0208400 A1 | | 8/2011 | Lickfold et al. |
| 2011/0286836 A1 | | 11/2011 | Davis |
| 2013/0219913 A1 | | 8/2013 | McCune et al. |
| 2013/0224003 A1 | | 8/2013 | Kupratis et al. |
| 2013/0287575 A1 | | 10/2013 | McCune et al. |
| 2013/0310213 A1 | | 11/2013 | Matsuoka et al. |
| 2013/0331223 A1 | | 12/2013 | McCune et al. |
| 2013/0331224 A1 | | 12/2013 | McCune et al. |
| 2014/0020404 A1 | | 1/2014 | Sheridan et al. |
| 2014/0133958 A1 | | 5/2014 | McCune et al. |
| 2014/0174056 A1 | | 6/2014 | Suciu et al. |

FOREIGN PATENT DOCUMENTS

| | | |
|---|---|---|
| EP | 253548 | 1/1988 |
| EP | 2270361 | 1/2001 |
| EP | 2270361 | 1/2011 |
| EP | 2532841 | 12/2012 |
| EP | 2532858 | 12/2012 |
| EP | 2551488 | 1/2013 |
| EP | 2949881 | 12/2015 |
| EP | 2809931 | 7/2016 |
| GB | 1516041 | 6/1978 |
| GB | 2041090 | 9/1980 |
| WO | 2007038674 | 4/2007 |
| WO | 2013116262 | 8/2013 |
| WO | 2014047040 | 3/2014 |
| WO | 2015156885 | 10/2015 |

OTHER PUBLICATIONS

Honeywell LF507. Jane's Aero-engines, Aero-engines—Turbofan. Feb. 9, 2012.

Honeywell TFE731. Jane's Aero-engines, Aero-engines—Turbofan. Jul. 18, 2012.

NASA Conference Publication. Quiet, powered-lift propulsion. Cleveland, Ohio. Nov. 14-15, 1978. pp. 1-420.

"Civil Turbojet/Turbofan Specifications", Jet Engine Specification Database (Apr. 3, 2005).

Kandebo, S.W. (1993). Geared-turbofan engine design targets cost, complexity. Aviation Week & Space Technology, 148(8). Start p. 32.

Hendricks, E.S. and Tong, M.T. (2012). Performance and weight estimates for an advanced open rotor engine. NASA/TM-2012-217710. pp. 1-13.

(56) References Cited

OTHER PUBLICATIONS

Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Zalud, T. (1998). Gears put a new spin on turbofan performance. Machine Design, 70(20), p. 104.
Optimised Gearbox Design for Modern Wind Turbines. Hicks, Cunliffe and Gifer; Nov. 20, 20014.
ANSI-AGMA 9004-A99 Flexible Couplings—Mass Elastic Properties and Other Characteristics.AGMA Standard. Approved Aug. 3, 1999.
ANSI-AGMA 6123-B06—IDesign Manual for Enclosed Epicyclic Gear Drives—AGMA Standard. Approved Sep. 20, 2006.
ANSI-AGMA 940-A09-Double Helical Epicyclic Gear Units. AGMA Information Sheet. Approved Jan. 6, 2009.
Youtube video; "PurePower PW1000G Engine: Customer Testimonials", published Jul. 26, 2010 (~seconds 43-63) available at https:www.youtube.com/watch?v=vgQgEftEd8c on Aug. 9, 2018.
Request for Opinion filed by Rolls Royce on Jul. 11, 2018 for European Patent No. EP2532858B1 granted Oct. 19 2016.
Request for Opinion filed by Rolls Royce on Jul. 11, 2018 for European Patent No. EP2737180B1 granted Apr. 13, 2016.
Request for Opinion filed by Rolls Royce on Jul. 11, 2018 for European Patent No. EP2532841B1 granted Apr. 27, 2016.
Litak, G. and Friswell, M.I. (2004). Dynamics of a gear system with faults in meshing stiffness. Nonlinear Dynamics (2005) 41: 415-421.
European Search Report for European Patent Application No. 16159312.4 completed Jun. 8, 2016.
Singapore Search Report and Written Opinion for Application No. 10201401514U dated May 26, 2017.
Warwick, G.(1993). Textron Lycoming LF507: Engine for Change. Flight International, p. 39-41, Aug. 31, 1993.
Decision Denying Institution of Inter Partes Review. *General Electric Company.*, Petitioner, v. *United Technologies Corp.*, Patent Owner. IPR2017-00522. U.S. Pat. No. 8,899,915. Entered Jun. 23, 2017. pp. 1-18.
European Search Report for European Patent Application No. 15777258.3 dated Apr. 10, 2017.
Abhijit Guha, "Optimum Fan Pressure Ratio for Bypass Engines with Separate or Mixed Exhaust Streams", Sep.-Oct. 2001, Journal of Propulsion and Power 17(5), p. 1117-1122.
Type Certificate Data Sheet A23WE, Department of Transportation Federal Aviation Administration, Oct. 25, 2001, pp. 1-23.
Unicom, Flying Magazine, Nov. 2002, vol. 129, No. 11, p. 68.
Rauch, Dale, "Design Study of an Air Pump and Integral Lift Engine ALF-504 Using the Lycoming 502 Core," NASA Report CR-120992, Jul. 31, 1972.
European Search Report for European Patent Application No. 17199484.1 dated Feb. 7, 2018.
Thulin, R.D., Howe, D.C., and Singer, I.D. (1982). Energy efficient engine: High pressure turbine detailed design report. Prepared for NASA. NASA CR-165608. pp. 1-178.
Warwick, G., "Civil Engines: Pratt & Whitney gears up for the future with GTF", Flight International, Nov. 2007, accessed on Jul. 17, 2015 at http://www.flightglobal.com/news/articles/civil-engines-pratt-amp-whitney-gears-up-for-the-future-with-gtf.
Peter Coy, "The Little Gear That Could Reshape the Jet Engine", Bloomberg Business, Oct. 15, 2015 [accessed on Mar. 24, 2017 at https://www.bloomberg.com/news/articles/2015-10-15/pratt-s-purepower-gtf-jet-engine-innovation-took-almost-30-years].
Bill Read, "Powerplant Revolution", AeroSpace, May 2014, pp. 28-31.
Andreas Peters et al., "Ultrashort Nacelles for Low Fan Pressure Ratio Propulsors", Sep. 10, 2014, Journal of Turbomachinery 137(2), Abstract.
NASA, Quest for Performance: The Evolution of Modern Aircraft, Part II: The Jet Age, Chapter 10: Technology of the Jet Airplane, Turbojet and Turbofan Systems, Dec. 2006, NASA.

Jane's Aero-Engines, Issue Seven, Edited by Bill Gunston, Jane's Information Group Inc., Alexandria, Virginia, 2000, pp. 1-47, 61, and 464-512.
Boggia, S. and Rud, K., "Intercooled Recuperated Gas Turbine Engine Concept", AIAA 2005-4192, 41st AIAA/ASME/SAE/ASEE Joint Propulsion Conference & Exhibit, Jul. 10-13, 2005, Tucson, Arizona, pp. 1-11.
Engber, et al., "Advanced Technologies for Next Generation Regional Jets—Survey of Research Activities at MTU Aero Engines", ISABE-2007-1282, Proceedings: XVIII International Symposium on Air Breathing Engines (ISABE), 18th ISABE Conference, Beijing, China, Sep. 2-7, 2007, pp. 1-11.
Kjelgaard, C., "Gearing Up for the GTF", Aircraft Technology, Issue 105, Apr.-May 2010, pp. 86, 88, 90, 92-95.
Decision to Deny Institution—Case IPR2018-01172, U.S. Pat. No. 8,297,916 B1. *General Electric Company*, Petitioner, v. *United Technologies Corporation*, Patent owner. Entered Nov. 29, 2018.
Decision to Deny Institution—Case IPR2018-01171, U.S. Pat. No. 8,297,916 B1. *General Electric Company*, Petitioner, v. *United Technologies Corporation*, Patent owner. Entered Nov. 29, 2018.
Kurzke, J. (2008). Preliminary Design, Aero-engine design: From state of the art turbofans towards innovative architectures. pp. 1-72.
Leckie, F.A. and Dal Bello, D.J. (2009). Strength and stiffness of engineering systems. Mechanical Engineering Series. Springer. pp. 1-3.
Declaration of Magdy Attia In re U.S. Pat. No. 8,899,915. Executed Dec. 13, 2016. pp. 1-71.
Declaration of Raymond Drago. In re U.S. Pat. No. 8,899,915. Executed Dec. 9, 2016. pp. 1-38.
Petition for Inter Partes Review of U.S. Pat. No. 8,899,915. *General Electric Company*, Petitioner, v. *United Technologies Corporation*, Patent Owner. Filed Dec. 21, 2016.
European Search Report for European Patent Application No. 12170479.5 completed on Jun. 26, 2014.
Grzegorz Litak et al.: "Dynamics of a Gear System with Faults in Meshing Stiffness", Nonlinear Dynamics, Kluwer Academic Publishers, DO, vol. 41, No. 4, Sep. 1, 2005, pp. 415-421.
European Search Report for European Patent Application No. 12170483.7 completed on Apr. 29, 2014.
International Search Report and Written Opinion for International Application No. PCT/US2013/060105 completed on Jan. 30, 2014.
International Preliminary Report on Patentability for International Application No. PCT/US2013/060105 dated Apr. 2, 2015.
European Search Report for European Application No. 15152745.4 dated Jun. 15, 2015.
European Search Report for European Patent Application No. 15175203.7 dated Oct. 15, 2015.
European Search Report for European Patent Application No. 15175205.2 dated Oct. 15, 2015.
European Search Report for for European Application No. 13828967.3 dated Oct. 14, 2014.
European Search Report for for European application No. 14155460.0 dated Sep. 2, 2014.
NASA, Engine Weight Model, Glenn Research Center, retrieved from, http://www.grc.nasa.gov/WWW/K-12/airplane/turbwt.html, Mar. 11, 2016.
Extended European Search Report for European Application No. 16155413.4 dated Jun. 23, 2016.
Du, S., "Modelling of spur gear mesh stiffness and static transmission error", 1998, Proc Instn Mech Engrs, vol. 212 Part C.
Patent Owner's Preliminary Response. *General Electric Company.*, Petitioner, v. *United Technologies Corp.*, Patent Owner. IPR2017-00522. U.S. Appl. No. 8,899,915. Entered Apr. 19, 2017. pp. 1-54.
Mattingly, J.D. (1996). Elements of gas turbine propulsion. New York, New York: McGraw-Hill, Inc. preface, pp. 719-720, 727-731, 735-738, 928-929, and 936-937.
Red Aviation. Part or Material Certification Form for various engine components. Dated Apr. 5, 2017.
Rethinking jet engines to make commercial aviation less of a threat to the climate (and the human respiratory system). Fortune. Retrieved Sep. 29, 2016 from: http://beta.fortune.com/change-the-world/united-technologies-8.

(56) References Cited

OTHER PUBLICATIONS

Gates, D. Bombardier flies at higher market. Seattle Times. Jul. 13, 2008. pp. C6.

Krauskopf, L. & Shumaker, L. (2014). GE exec says avoided geared design in jet engine battle with Pratt. Reuters. Sep. 15, 2014. http://www.reuters.com/article/us-general-electric-united-tech-engine-idUSKBN0HA2H620140915.

Grose, T.K. (2013). Reshaping flight for fuel efficiency: Five technologies on the runway. National Geographic. Retrieved Mar. 16, 2016 from: http://news.nationalgeographic.com/news/energy/2013/04/130423-reshaping-flight-for-fuel-efficiency.html.

Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.

Adams, Eric. (2016) The World's Hugest Jet Engine Is Wider Than a 737s Fuselage. Apr. 28, 2016. www.wired.com/2016/04/worlds-hugest-jet-engine-wider-737s-fuselage/ accessed on Apr. 28, 2016).

Jane's Aero-Engines, Issue Seven, Edited by Bill Gunston, Janes Information Group Inc., Alexandria, Virginia, 2000, pp. 1-67, 464-470, 475-476, 482-488, 494-508, 510-512.

International Preliminary Report on Patentability for International Application No. PCT/US2015/012346 dated Aug. 4, 2016.

Kasuba, R. and August, R. (1984) Gear Mesh Stiffness and Load Sharing in Planetary Gearing. The American Society of Mechanical Engineers. New York, NY.

Hill, P.G. and Peterson, C.R. (1970) Mechanics and Thermodynamics of Propulsion. Addison-Wesley Series in Aerospace Science. 1970. Chapter 9-4.

Hill, P.G. and Peterson, C.R. (1992) Mechanics and Thermodynamics of Propulsion. Second Edition, Addison-Wesley Publishing Company, 1992, pp. 400-406.

Grzegroz, L. and Friswell, M. Dynamics of a gear system with faults in meshing stiffness. Nonlinear Dynamics (2005)41. pp. 415-421.

European Search Report for European Patent Application No. 16174051 completed Oct. 21, 2016.

Third Party Observations for European Patent Application No. 16159312.4 filed Jun. 22, 2018. dated Jul. 3, 2018.

Defeo, A. and Kulina, M. (1977). Quiet clean short-haul experimental engine (QCSEE) main reduction gears detailed design final report. Prepared for NASA. NASA-CR-134872. Jul. 1977. pp. 1-221.

Amezketa, M., Iriarte, X., Ros, J., and Pintor, J. (2009). Dynamic model of a helical gear pair with backlash and angle0varying mesh stiffness. Multibody Dynamics 2009, ECCOMAS Thematic Conference. 2009. pp. 1-36.

Singh, A. (2005). Application of a system level model to study the planetary load sharing behavior. Jounal of Mechanical Design. vol. 127. May 2005. pp. 469-476.

Smith-Boyd, L. and Pike, J. (1986). Expansion of epicyclic gear dynamic analysis program. Prepared for NASA. NASA CR-179563. Aug. 1986. pp. 1-98.

Wikipedia. Torsion spring. Retrieved Jun. 29, 2018 from: https://en.wikipedia.org/wiki/Torsion_spring.

AGMA Standard (2006). Design manual for enclosed epicyclic gear drives. Alexandria, VA: American Gear Manufacturers Association. pp. 1-104.

AGMA Standard (1997). Design and selection of components for enclosed gear drives. Alexandria, VA: American Gear Manufacturers Association. pp. 1-48.

Third Party Observations for European Patent Application No. 11250208.3 filed Jul. 20, 2018. dated Jul. 26, 2018.

Third Party Observations for European Patent Application No. 17199484.1 filed Jul. 5, 2018. dated Jul. 12, 2018.

Third Party Observations for European Patent Application No. 13775188.9 filed Sep. 10, 2018. dated Sep. 17, 2018.

Notice of Opposition for European Patent No. 3051078 filed Jul. 31, 2018.

Robert G. Parker and Jian Lin, "Modeling, Modal Properties, and Mesh Stiffness Variation Instabilities of Planetary Gears", May 2001, NASA Glenn Research Center, CR-2001-210939, ARL-CL-462.

Oscar Van Deventer, "Extreme Reduction—11 million to one gearing", Shapeways.com, accessed on Nov. 13, 2017, https://www.shapeways.com/product/EQJQZEVWU/extreme-reduction-11-million-to-one-gearing.

Kapelevich, "High Gear Ratio Epicyclic Drives Analysis", Jun. 2014, American Gear Manufacturers Association, geartechnology.com, pp. 62-67.

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida. pp. 145-153.

Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.

Carney, K., Pereira, M. Revilock, and Matheny, P. (2003). Jet engine fan blade containment using two alternate geometries. 4th European LS-DYNA Users Conference. pp. 1-10.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis. pp. 1-60.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case pp. 1-4.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.

Brennan, P.J. and Kroliczek, E.J. (1979). Heat pipe design handbook. Prepared for National Aeronautics and Space Administration by B & K Engineering, Inc. Jun. 1979. pp. 1-348.

Horikoshi, S. and Serpone, N. (2013). Introduction to nanoparticles. Microwaves in nanoparticle synthesis. Wiley-VCH Verlag GmbH & Co. KGaA. pp. 1-24.

Kerrebrock, J.L. (1977). Aircraft engines and gas turbines. Cambridge, MA: The MIT Press. p. 11.

Xie, M. (2008). Intelligent engine systems: Smart case system. NASA/CR-2008-215233. pp. 1-31.

Knip, Jr., G. (1987). Analysis of an advanced technology subsonic turbofan incorporating revolutionary materials. NASA Technical Memorandum. May 1987. pp. 1-23.

Willis, W.S. (1979). Quiet clean short-haul experimental engine (QCSEE) final report. NASA/CR-159473 pp. 1-289.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press. p. 465.

Ramsden, J.M. (Ed). (1978). The new European airliner. Flight International, 113(3590). 39-43. Jan. 7, 1978. pp. 39-43.

Langston, L. and Faghri, A. Heat pipe turbine vane cooling. Prepared for Advanced Turbine Systems Annual Program Review. Morgantown, West Virginia. Oct. 17-19, 1995. pp. 3-9.

(56) References Cited

OTHER PUBLICATIONS

Oates, G.C. (Ed). (1989). Aircraft propulsion systems and technology and design. Washington, D.C.: American Institute of Aeronautics, Inc. pp. 341-344.
Lau, K., Gu, C., and Hui, D. (2005). A critical review on nanotube and nanotube/nanoclay related polymer composite materials. Composites: Part B 37(2006) 425-436.
Shorter Oxford English dictionary, 6th Edition. (2007). vol. 2, N-Z. p. 1888.
Lynwander, P. (1983). Gear drive systems: Design and application. New York, New York: Marcel Dekker, Inc. pp. 145, 355-358.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc. pp. 8-15.
Pyrograf-III Carbon Nanofiber. Product guide. Retrieved Dec. 1, 2015 from: http://pyrografproducts.com/Merchant5/merchant.mvc?Screen=cp_nanofiber.
Nanocor Technical Data for Epoxy Nanocomposites using Nanomer 1.30E Nanoclay. Nnacor, Inc. Oct. 2004.
Ratna, D. (2009). Handbook of thermoset resins. Shawbury, UK: iSmithers. pp. 187-216.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994. pp. 1-7.
Merriam-Webster's collegiate dictionary, 11th Ed. (2009). p. 824.
Merriam-Webster's collegiate dictionary, 10th Ed. (2001). p. 1125-1126.
Whitaker, R. (1982). ALF 502: plugging the turbofan gap. Flight International, p. 237-241, Jan. 30, 1982.
Hughes, C. (2010). Geared turbofan technology. NASA Environmentally Responsible Aviation Project. Green Aviation Summit. NASA Ames Research Center. Sep. 8-9, 2010. pp. 1-8.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Moxon, J. How to save fuel in tomorrow's engines. Flight International. Jul. 30, 1983. 3873(124). pp. 272-273.
File History for U.S. Appl. No. 12/131,876.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Gunston, B. (Ed.) (2000). Jane's aero-engines, Issue seven. Coulsdon, Surrey, UK: Jane's Information Group Limited. pp. 510-512.
Ivchenko-Progress D-436. Jane's Aero-engines, Aero-engines—Turbofan. Feb. 8, 2012.
Ivchenko-Progress AI-727M. Jane's Aero-engines, Aero-engines—Turbofan. Nov. 27, 2011.
Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Honeywell LF502. Jane's Aero-engines, Aero-engines—Turbofan. Feb. 9, 2012.
Third Party Observations and Concise Description of Relevance of Document for U.S. Appl. No. 15/816,487 dated Jul. 25, 2018.

AGMA Standard (1999). Flexible couplings—Mass elastic properties and other characteristics. Alexandria, VA: American Gear Manufacturers Association. pp. 1-46.
U.S. Appl. No. 61/494,453 filed Jun. 8, 2011 titled Geared Engine Flexible Mount Arrangement.
Damerau, J. (2014) What is the mesh stiffness of gears? Screen shot of query submitted by Vahid Dabbagh, answered by Dr. Jochan Damerau, Research General Manager at Bosch Corp., Japan. Retrieved from: https://www.researchgate.net/post/What_is_the_mesh_stiffness_of gears.
Third Party Observations and Concise Description of Relevance of Document for U.S. Appl. No. 15/856,396 dated Aug. 31, 2018.
*Dr. Raymond G. Tronzo v. Biomet Inc.*, 156 F.3d 1154 (1998).
Third Party Observations and Concise Description of Relevance of Document for U.S. Appl. No. 15/881,240 dated Aug. 31, 2018.
Third Party Observations and Concise Description of Relevance of Document for U.S. Appl. No. 15/185,292 dated Jul. 5, 2018.
McCune, M.E. (1993). Initial test results of 40,000 horsepower fan drive gear system for advanced ducted propulsion systems. AIAA 29th Joint Conference and Exhibit. Jun. 28-30, 1993. pp. 1-10.
Wendus, B.E., Stark, D.F., Holler, R.P., and Funkhouser, M.E. (2003). "Follow-on technology requirement study for advanced subsonic transport". NASA/CR-2003-212467.
Garrett, (1987). "TFE731".
Roux, E. (2007). "Turbofan and turbojet engines database handbook". Editions Elodie Roux. Blagnac: France. p. 41-42; p. 465; p. 468-469.
Kurzke, J. (2009). Fundamental differences between conventional and geared turbofans. Proceedings of ASME Turbo Expo: Power for Land, Sea, and Air. 2009, GT2009-59745, Orlando, Florida.
Mattingly, J.D. (1996). Elements of gas turbine propulsion. New York, New York: McGraw-Hill, Inc.
Riegler, C. (2007). The Geared Turbofan Technology—Opportunities, Challenged and Readiness Status. Proceedings CEAS 2007.
Waters, M.H. and Schairer, E.T. (1977). Analysis of turbofan propulsion system weight and dimensions. NASA Technical Memorandum. NASA TM-X-73. Jan. 1977. p. 199.
Daly, M. Ed. (2010). Jane's Aero-Engine. Issue Twenty-seven. Mar. 2010. p. 633-636.
Hill, P.G. and Peterson, C.R. (1992). Mechanics and Thermodynamics of Propulsion, Second Edition. Addison-Wesley Publishing Company. pp. 400-406.
Hill, P.G. and Peterson, C.R. (1970). Mechanics and Thermodynamics of Propulsion. Addison-Wesley Series in Aerospace Science. Chapter 9-4.
Leckie, F.A. and Dal Bello, D.J. (2009). Strength and stiffness of engineering systems. Mechanical Engineering Series. Springer. pp. 1-10, 48-51.
Dudley, D.W., Ed. (1954). Handbook of practical gear design. Lancaster, PA: Technomic Publishing Company, Inc. pp. 3.96-102 and 8.12-18.
Dudley, D.W., Ed. (1962). Gear handbook. New York, NY: McGraw-Hill. pp. 3.14-18 and 12.7-12.21.
Gray, D.E. (1978). Energy efficient engine preliminary design and integration studies. Prepared for NASA. NASA CR-135396. Nov. 1978. pp. 1-366.
Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.
Reynolds, C.N. (1985). Advanced prop-fan engine technology (APET) single- and counter-rotation gearbox/pitch change mechanism. Prepared for NASA. NASA CR-168114 (vol. II). Jul. 1985. pp. 1-175.
U.S. Department of Transportation: Federal Aviation Administration Type Certificate Data Sheet No. E6WE. Dated: May 9, 2000. p. 1-9.
Honeywell Sabreliner 65 TFE731-3 to -3D Engine Upgrade Program. Oct. 2005. pp. 1-4.
Honeywell Learjet 31 and 35/36 TFE731-2 to 2C Engine Upgrade Program. Sep. 2005. pp. 1-4.
Kurzke, J. (2012). GasTurb 12: Design and off-design performance of gas turbines. Retrieved from: https://www.scribd.com/document/153900429/GasTurb-12.

(56) References Cited

OTHER PUBLICATIONS

Ahmad, F. and Mizramoghadam, A.V. (1999). Single v. two stage high pressure turbine design of modern aero engines. ASME. Prestend at the International Gast Turbine & Aeroengine Congress & Exhibition. Indianapolis, Indiana. Jun. 7-10, 1999. pp. 1-9.
English translation of Measurement and calculation methodology on TFE731-2, TFE731-3A and TFE731-3D models.
English translation of Expert certificate concerning the technical nature of the drawings used in the measurement and calculation methodology.
Declaration of Raymond Drago. In re U.S. Pat. No. 8,297,916. IPR2018-01172. Executed May 29, 2018. pp. 1-115.
Parker, R.G. and Lin, J. (2001). Modeling, modal properties, and mesh stiffness variation instabilities of planetary gears. Prepared for NASA. NASA/CR-2001-210939. May 2001. pp. 1-111.
Declaration of Courtney H. Bailey. In re U.S. Pat. No. 8,511,605. Executed Jul. 19, 2016. pp. 1-4.
Mancuso, J.R. and Corcoran, J.P. (2003). What are the differences in high performance flexible couplings for turbomachinery? Proceedings of the Thirty-Second Turbomachinery Symposium. 2003. pp. 189-207.
Dudley, D.W., Ed. (1994). Practical gear design. New York, NY: McGraw-Hill. pp. 119-124.
Daly, M. and Gunston, B. (2008). Jane's Aero-Engines. Pratt & Whitney PW8000. Issue Twenty-three.
Notice of Opposition to Patent No. EP2811120. United Technologies Corporation opposed by Rolls Royce. Issued on Apr. 12, 2018.
Petition for Inter Partes Review of U.S. Pat. No. 8,297,916. *General Electric Company, Petitioner, v. United Technologies Corporation, Patent Owner*. IPR2018-01171. Filed May 30, 2018.
Petition for Inter Partes Review of U.S. Pat. No. 8,297,916. *General Electric Company, Petitioner, v. United Technologies Corporation, Patent Owner*. IPR2018-01172. Filed May 30, 2018.
Notice of Opposition to Patent No. EP2949882. United Technologies Corporation opposed by Rolls Royce. dated Aug. 23, 2017.
English Translation of Notice of Opposition to Patent No. EP2811120. United Technologies Corporation opposed by Safran Aircraft Engines. dated Jul. 12, 2017.
English Translation of Notice of Opposition to Patent No. EP299882. United Technologies Corporation opposed by Safran Aircraft Engines. dated May 23, 2018.
August, R. "Dynamics of Planetary Gear Trains", Jun. 1984, NASA Contractor Report 3793, p. 13-16.
Response to Observations by Patentee filed by Rolls Royce on Jan. 18, 2019 for European Patent No. EP2532858B1 granted Oct. 19, 2016.
Response to Observations by Patentee filed by Rolls Royce on Jul. 18, 2018 for European Patent No. EP2737180B1 granted Apr. 13, 2016.
Response to Observations by Patentee filed by Rolls Royce on Jul. 18, 2018 for European Patent No. EP2532841B1 granted Apr. 27, 2016.
EP Office Action for European Application No. 16174051.9 dated Oct. 15, 2018.
EP Office Action for European Application No. 17199484.1 dated Jan. 2, 2019.
EP Office Action for European Application No. 16159312.4 dated Oct. 16, 2018.
European Search Report for European Application No. 16152821.1 completed Jun. 16, 2016.
Safran Opposition(English Translation) dated May 28,2019 for EP Patent No. 2949881.
Rolls-Royce Opposition dated May 28, 2019 for EP Patent No. 2949881.
Rolls-Royce Opposition dated Jul. 9, 2018 for EP Patent Application No. 16174051.9 EP3098396.
Amezketa, M., Iriarte, X., Ros, J., and Pintor, J. (2009). Dynamic model of a helical gear pair with backlash and angle0varying mesh stiffness. Multibody Dynamics 2009, pp. 1-36.

Wikipedia. Stiffness. Retrieved Jun. 28, 2018 from: https://en.wikipedia.org/wiki/Stiffness.
Daly, M. Ed. (2007). Jane's Aero-Engine. Issue Twenty-three. Mar. 2008. p. 707-712.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 668-670, 673-675, 682-685, 697-705, 726-727, 731-733, 802-805, 828-830, 862-864, and 923-927.
Product Brochure. Garrett TFE731. Allied Signal. Copyright 1987. pp. 1-24.
Preliminary Opinion of the Opposition Division in the opposition to patent EP2949882 dated Mar. 13, 2019.
Holder's Response to Written Opinion of Sep. 29, 2015. European Patent Application No. 15175205.2 (2949882) dated Jun. 1, 2016.
Annex to the Notice un Article 94(3) EPC issued by the Examination Division. European Patent Application No. 13837107.5 dated Jan. 25, 2019.
Turbofan and Turbojet Engines, Data Handbook. Elodie Roux. p. 41-42, p. 465, p. 468-469.
Ahmad, F. and Mizramoghadam, A.V. (1999). Single v. two stage high pressure turbine design of modern aero engines. ASME. Presented at the International Gas Turbine & Aeroengine Congress & Exhibition. Indianapolis, Indiana. Jun. 7-10, 1999. pp. 1-9.
Gray, D.E. and Gardner, W.B. (1983). Energy efficient engine program technology benefit/cost study—vol. 2. NASA CR-174766. Oct. 1983. pp. 1-118.
Attestation of Didier Escure signed Sep. 17, 2018.
Attestation of Philippe Pellier signed Apr. 12, 2017.
Waters, M.H. and Schairer, E.T. (1977). Analysis of turbofan propulsion system weight and dimensions. NASA Technical Memorandum. Jan. 1977. pp. 1-65.
Preliminary Opinion of the Opposition Division in the opposition to patent EP3051078 dated Apr. 16, 2019.
Observation filed by Rolls-Royce on Oct. 29, 2018 for Patent No. EP2811120 (European Patent Application No. 14155460.0).
Wendus, B.E., Stark, D.F., Holler, R.P., and Funkhouser, M.E. (2003). Follow-on technology requirement study for advanced subsonic transport. NASA/CR-2003-212467. pp. 1-37.
Decision of the Opposition Division. European Patent No. 2949882 (Application No. 15175205.2) dated Nov. 26, 2018.
Observation filed by Rolls-Royce on May 22, 2018 for European Patent No. EP2949882, (EP Application No. 15175205.2).
Opposition—further submission filed by Safran on Mar. 12, 2019 for European Patent No. EP2949882, (EP Application No. 15175205.2). English and French version.
Riegler, C., and Bichlmaier, C. (2007). The geared turbofan technology—Opportunities, challenges and readiness status. Porceedings CEAS. Sep. 10-13, 2007. Berlin, Germany. pp. 1-12.
Letter from the Opponent for European Patent Application No. 2811120 (14155460.0) dated Feb. 15, 2019 by Safran Aircraft Engines.
Product Brochure. The ALF 502R turbofan: technology, ecology, economy. Avco Lycoming Textron.
Peter Lynwander of American Lohmann Corporation, New Jersey, "Gear Drive Systems: Design and Application", 1983 Marcel Dekker Inc. NY and Basel, GE-1018.008 PP. (year 1983).
https://en.wikipedia.org/wiki/Torsion_spring.†
https://en.wikipedia.org/wiki/Stiffness.†
U.S. Appl. No. 61/494,453.†
http://www.researchgate.net/post/What_is_the_mesh-stiffness_of gears.†
Amezketa et al., Dynamic Model of a Helical Gear Pair with Backlash and Angle-Varying Mesh Stiffness, pp. 1-17, Jul. 2, 2009, Multibody Dynamics 2009, ECCOMAS Thematic Conference, Warsaw, Poland.†
ANSI/AGMA 6123-B06, American National Standard—Design Manual for Enclosed Epicyclic Gear Drives, AGMA, Alexandria, Virginia, 2006.†

\* cited by examiner
† cited by third party

FLEXIBLE SUPPORT STRUCTURE FOR A GEARED ARCHITECTURE GAS TURBINE ENGINE

CROSS REFERENCE TO RELATED APPLICATIONS

The present disclosure is a continuation of U.S. patent application Ser. No. 13/938,466 filed Jul. 10, 2013, which is a continuation of U.S. patent application Ser. No. 13/623, 309, filed Sep. 20, 2012, which is now U.S. Pat. No. 9,133,729 granted Sep. 15, 2015, which is a continuation-in-part of U.S. patent application Ser. No. 13/342,508, filed Jan. 3, 2012, which is now U.S. Pat. No. 8,297,916 granted Oct. 30, 2012, which claims priority to U.S. Provisional Patent Application No. 61/494,453, filed Jun. 8, 2011.

BACKGROUND

The present disclosure relates to a gas turbine engine, and more particularly to a flexible support structure for a geared architecture therefor.

Epicyclic gearboxes with planetary or star gear trains may be used in gas turbine engines for their compact designs and efficient high gear reduction capabilities. Planetary and star gear trains generally include three gear train elements: a central sun gear, an outer ring gear with internal gear teeth, and a plurality of planet gears supported by a planet carrier between and in meshed engagement with both the sun gear and the ring gear. The gear train elements share a common longitudinal central axis, about which at least two rotate. An advantage of epicyclic gear trains is that a rotary input can be connected to any one of the three elements. One of the other two elements is then held stationary with respect to the other two to permit the third to serve as an output.

In gas turbine engine applications, where a speed reduction transmission is required, the central sun gear generally receives rotary input from the powerplant, the outer ring gear is generally held stationary and the planet gear carrier rotates in the same direction as the sun gear to provide torque output at a reduced rotational speed. In star gear trains, the planet carrier is held stationary and the output shaft is driven by the ring gear in a direction opposite that of the sun gear.

During flight, light weight structural cases deflect with aero and maneuver loads causing significant amounts of transverse deflection commonly known as backbone bending of the engine. This deflection may cause the individual sun or planet gear's axis of rotation to lose parallelism with the central axis. This deflection may result in some misalignment at gear train journal bearings and at the gear teeth mesh, which may lead to efficiency losses from the misalignment and potential reduced life from increases in the concentrated stresses.

SUMMARY

In one exemplary embodiment, a geared architecture for a gas turbine engine includes a fan shaft and a frame which supports said fan shaft. The frame defines a frame stiffness. A plurality of gears drives the fan shaft and includes a gear mesh that defines a gear mesh stiffness. A stiffness of a ring gear of the plurality of gears is less than about 20% of the gear mesh stiffness. A flexible support supports the geared architecture and defines a flexible support stiffness. An input coupling to the plurality of gears defines an input coupling stiffness. The flexible support stiffness and the input coupling stiffness are each less than about 11% of the frame stiffness.

In a further embodiment of any of the above, the frame and the flexible support are mounted to a static structure of a gas turbine engine.

In a further embodiment of any of the above, the input coupling is mounted to a sun gear of the gear system.

In a further embodiment of any of the above, the fan shaft is mounted to a ring gear of the gear system.

In a further embodiment of any of the above, the plurality of gears are form a star system.

In a further embodiment of any of the above, the fan shaft is mounted to a planet carrier of the gear system.

In a further embodiment of any of the above, the flexible support stiffness is less than about 8% of the gear mesh stiffness.

In a further embodiment of any of the above, the input coupling stiffness is less than about 5% of the gear mesh stiffness.

In a further embodiment of any of the above, the flexible support stiffness defines at least one of a lateral stiffness and a transverse stiffness. The gear mesh stiffness defines at least one of a lateral stiffness and a transverse stiffness. The input coupling stiffness defines at least one of a lateral stiffness and a transverse stiffness.

In a further embodiment of any of the above, the lateral stiffness refers to a perpendicular direction with respect to an axis of rotation of the gas turbine engine. The transverse stiffness refers to a pivotal bending movement with respect to the axis of rotation of the gas turbine engine.

In a further embodiment of any of the above, the frame which supports the fan shaft and defines the frame stiffness is a K-frame bearing support which supports a bearing system that supports the fan shaft.

In a further embodiment of any of the above, the flexible support stiffness is less than the gear mesh stiffness.

In a further embodiment of any of the above, the input coupling stiffness is less than the gear mesh stiffness.

In another exemplary embodiment, a geared architecture for a gas turbine engine includes a fan shaft and a frame which supports the fan shaft. The frame defines a frame stiffness. A plurality of gears which drives the fan shaft includes a gear mesh that defines a gear mesh stiffness. At least one of a lateral stiffness and a transverse stiffness of a ring gear of the plurality of gears is less than about 12% of the gear mesh stiffness. A flexible support supports the geared architecture and defines a flexible support stiffness that is less than the gear mesh stiffness. An input coupling to the plurality of gears defines an input coupling stiffness that is less than the gear mesh stiffness. The flexible support stiffness and the input coupling stiffness are each less than 11% of the frame stiffness.

In a further embodiment of any of the above, the flexible support stiffness is less than about 8% of the gear mesh stiffness.

In a further embodiment of any of the above, the input coupling stiffness is less than about 5% of the gear mesh stiffness.

In a further embodiment of any of the above, the flexible support supports a carrier of the geared architecture.

In a further embodiment of any of the above, the flexible support supports a ring gear of the geared architecture.

In a further embodiment of any of the above, the flexible support stiffness defines at least one of a lateral stiffness and a transverse stiffness. The gear mesh stiffness defines at least one of a lateral stiffness and a transverse stiffness. The input coupling stiffness defines at least one of a lateral stiffness and a transverse stiffness.

In a further embodiment of any of the above, the lateral stiffness refers to a perpendicular direction with respect to an axis of rotation of the gas turbine engine. The transverse stiffness refers to a pivotal bending movement with respect to the axis of rotation of the gas turbine engine.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
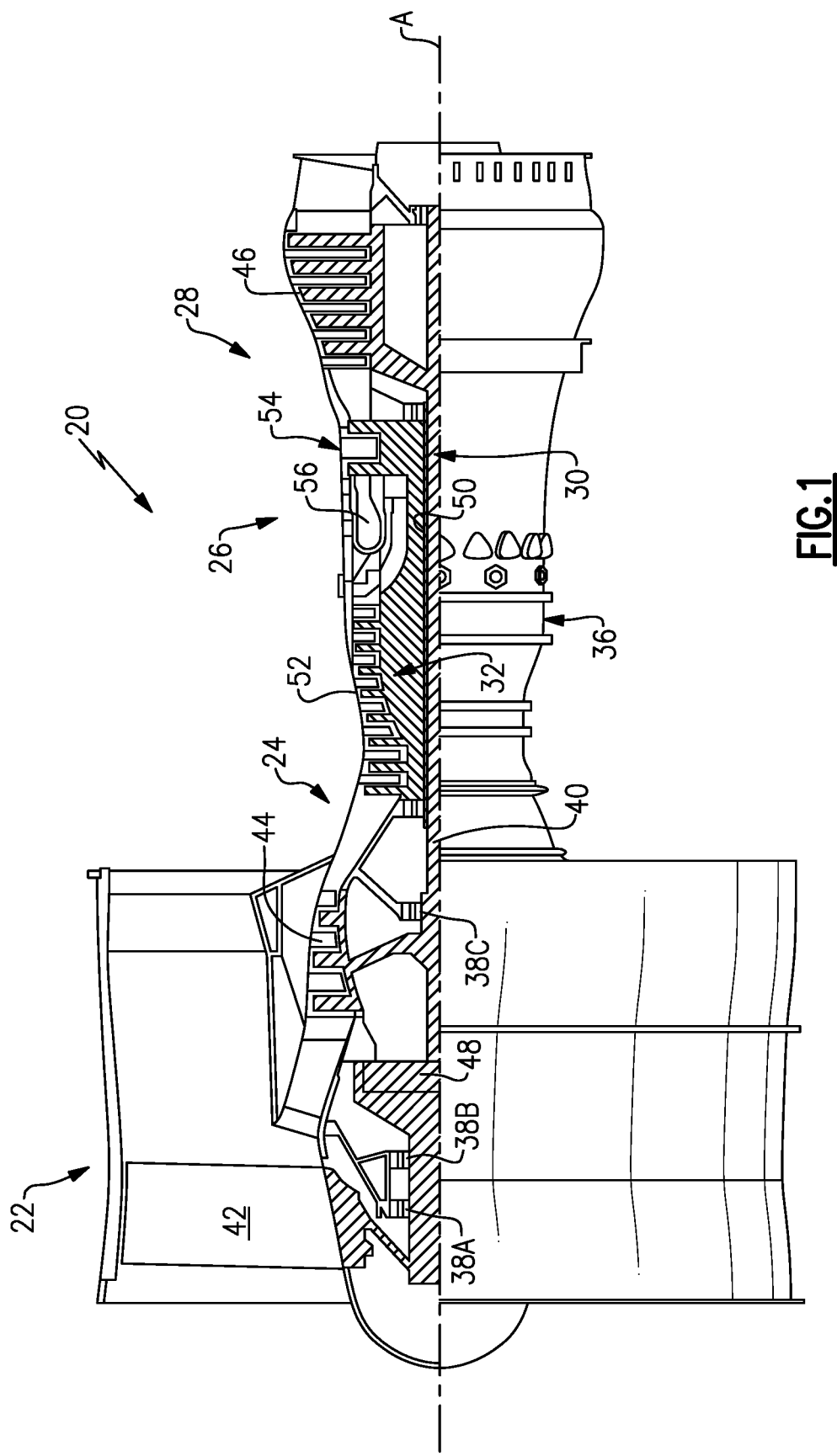
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines such as a three-spool architecture gas turbine engine and an open rotor (unducted fan) engine.

The engine 20 generally includes a low speed spool 30 and a high speed spool 32 mounted for rotation about an engine central longitudinal axis A relative to an engine static structure 36 via several bearing systems 38A-38C. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion of the airflow passing therethrough.

Figure 2:
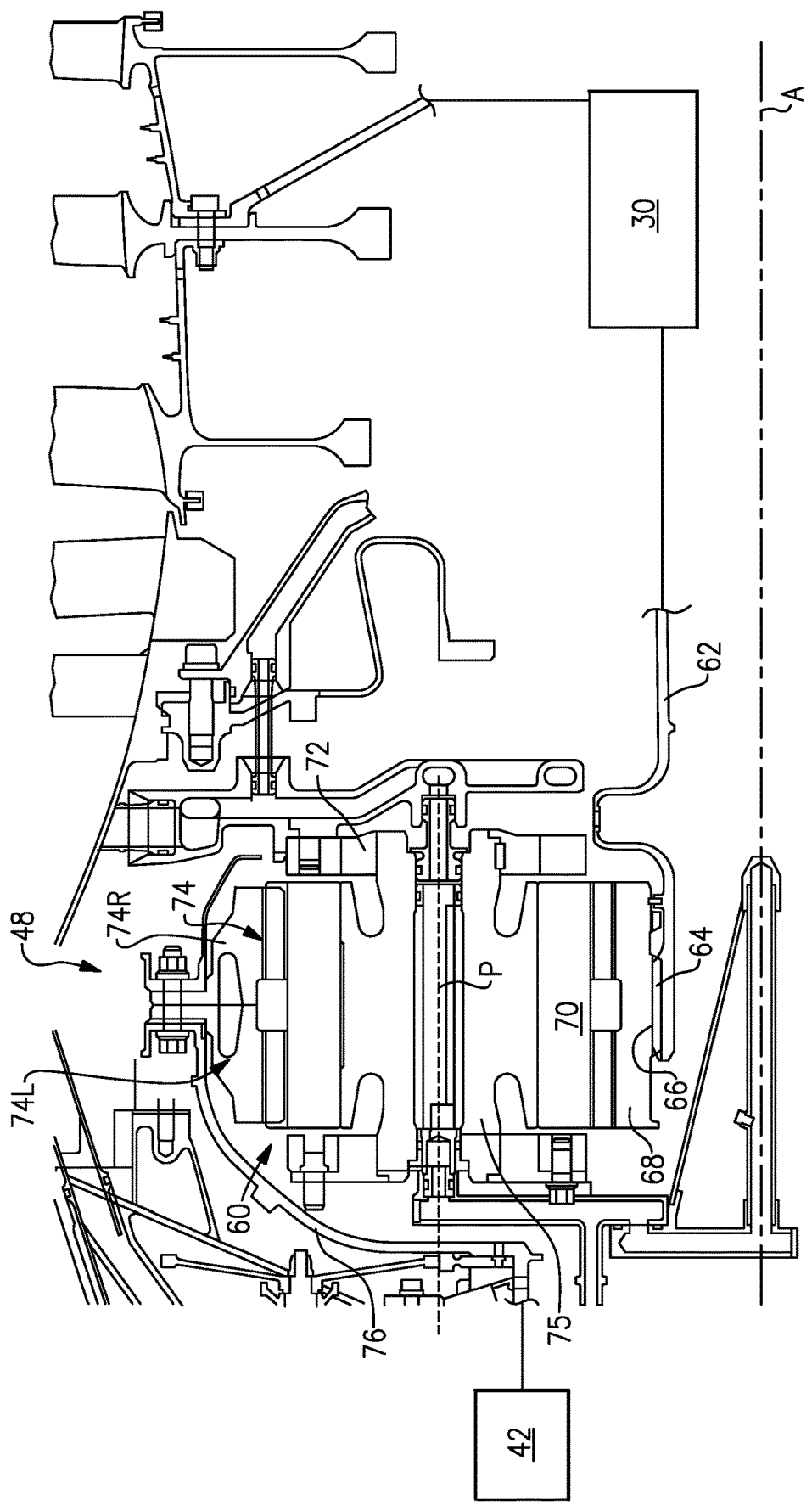
FIG. 2 is an enlarged cross-section of a section of the gas turbine engine which illustrates a fan drive gear system (FDGS)

With reference to FIG. 2, the geared architecture 48 generally includes a fan drive gear system (FDGS) 60 driven by the low speed spool 30 (illustrated schematically) through an input coupling 62. The input coupling 62 both transfers torque from the low speed spool 30 to the geared architecture 48 and facilitates the segregation of vibrations and other transients therebetween. In the disclosed non-limiting embodiment, the FDGS 60 may include an epicyclic gear system which may be, for example, a star system or a planet system.

The input coupling 62 may include an interface spline 64 joined, by a gear spline 66, to a sun gear 68 of the FDGS 60. The sun gear 68 is in meshed engagement with multiple planet gears 70, of which the illustrated planet gear 70 is representative. Each planet gear 70 is rotatably mounted in a planet carrier 72 by a respective planet journal bearing 75. Rotary motion of the sun gear 68 urges each planet gear 70 to rotate about a respective longitudinal axis P.

Each planet gear 70 is also in meshed engagement with rotating ring gear 74 that is mechanically connected to a fan shaft 76. Since the planet gears 70 mesh with both the rotating ring gear 74 as well as the rotating sun gear 68, the planet gears 70 rotate about their own axes to drive the ring gear 74 to rotate about engine axis A. The rotation of the ring gear 74 is conveyed to the fan 42 (FIG. 1) through the fan shaft 76 to thereby drive the fan 42 at a lower speed than the low speed spool 30. It should be understood that the described geared architecture 48 is but a single non-limiting embodiment and that various other geared architectures will alternatively benefit herefrom.

Figure 3:
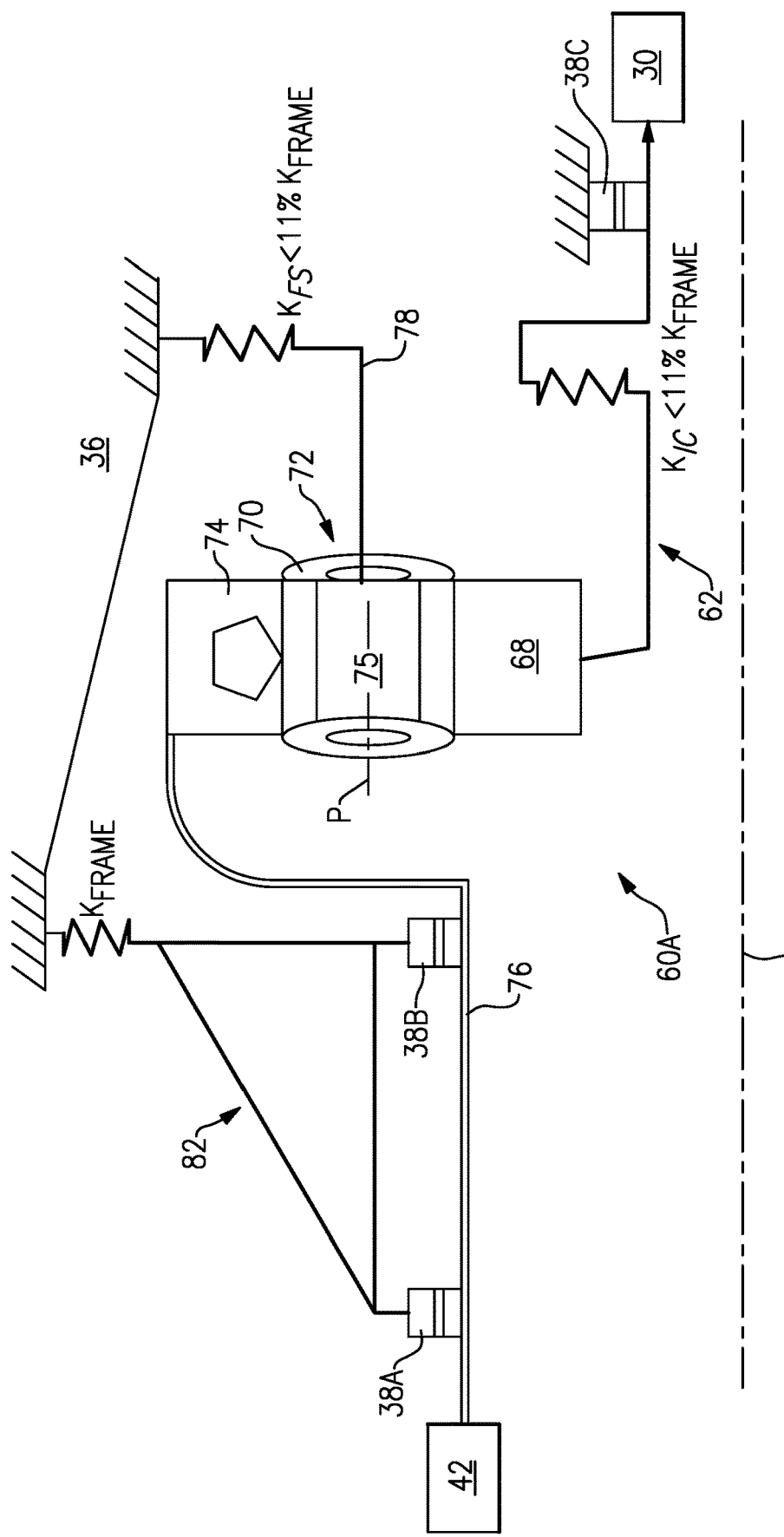
FIG. 3 is a schematic view of a flex mount arrangement for one non-limiting embodiment of the FDGS.

With reference to FIG. 3, a flexible support 78 supports the planet carrier 72 to at least partially support the FDGS 60A with respect to the static structure 36 such as a front center body which facilitates the segregation of vibrations and other transients therebetween. It should be understood that various gas turbine engine case structures may alternatively or additionally provide the static structure and flexible support 78. It is to be understood that the term "lateral" as used herein refers to a perpendicular direction with respect to the axis of rotation A and the term "transverse" refers to a pivotal bending movement with respect to the axis of rotation A so as to absorb deflections which may be otherwise applied to the FDGS 60. The static structure 36 may further include a number 1 and 1.5 bearing support static structure 82 which is commonly referred to as a "K-frame" which supports the number 1 and number 1.5 bearing systems 38A. 38B. Notably, the K-frame bearing support defines a lateral stiffness (represented as Kframe in FIG. 3) and a transverse stiffness (represented as Kframe$^{BEND}$ in FIG. 3) as the referenced factors in this non-limiting embodiment.

In this disclosed non-limiting embodiment, the lateral stiffness (KFS; KIC) of both the flexible support 78 and the input coupling 62 are each less than about 11% of the lateral stiffness (Kframe). That is, the lateral stiffness of the entire FDGS 60 is controlled by this lateral stiffness relationship. Alternatively, or in addition to this relationship, the transverse stiffness of both the flexible support 78 and the input coupling 62 are each less than about 11% of the transverse stiffness (Kframe$^{BEND}$). That is, the transverse stiffness of the entire FDGS 60 is controlled by this transverse stiffness relationship.

Figure 4:
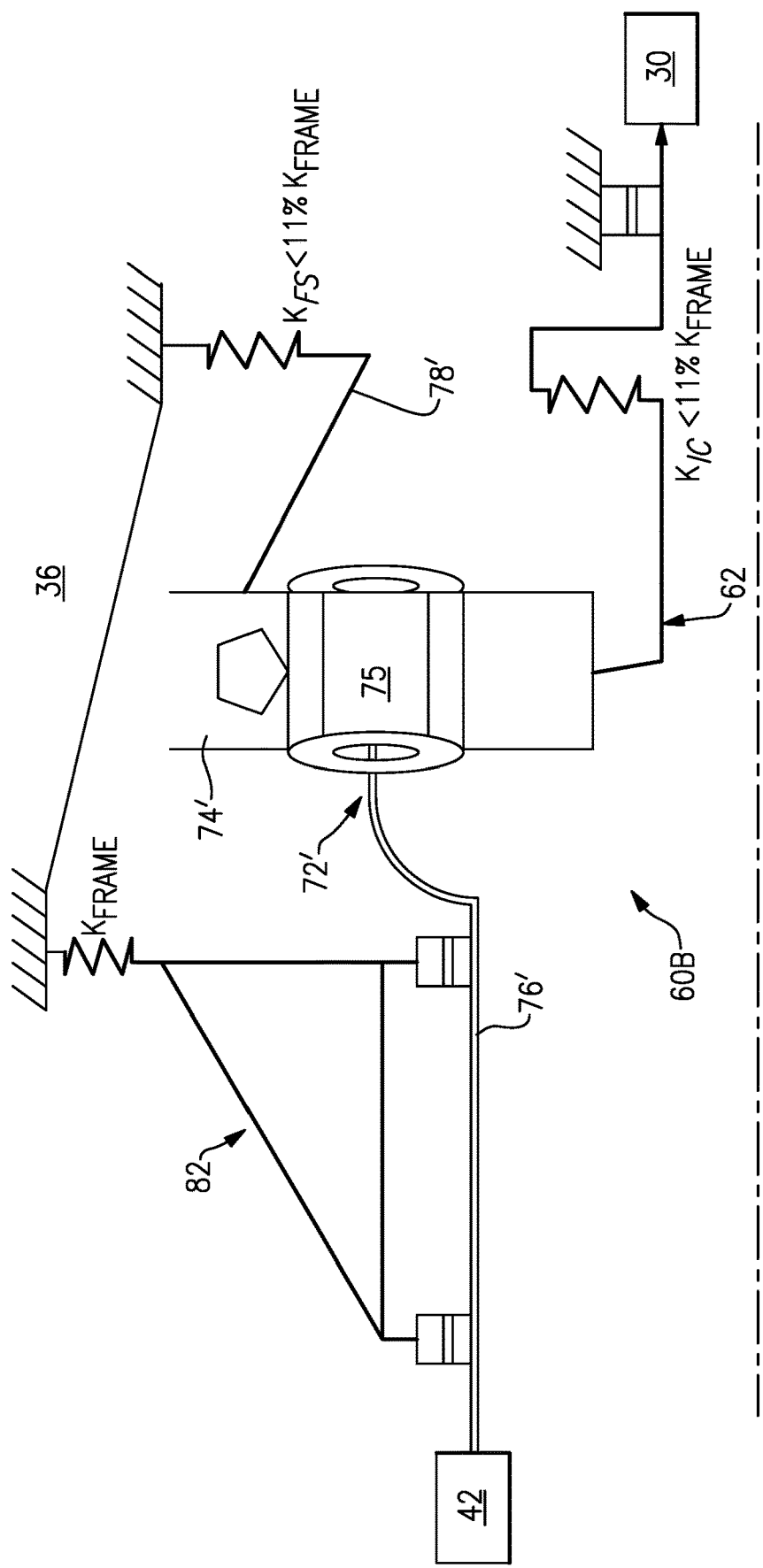
FIG. 4 is a schematic view of a flex mount arrangement for another non-limiting embodiment of the FDGS.

With reference to FIG. 4, another non-limiting embodiment of a FDGS 60B includes a flexible support 78' that supports a rotationally fixed ring gear 74'. The fan shaft 76' is driven by the planet carrier 72' in the schematically illustrated planet system which otherwise generally follows the star system architecture of FIG. 3.

Figure 5:
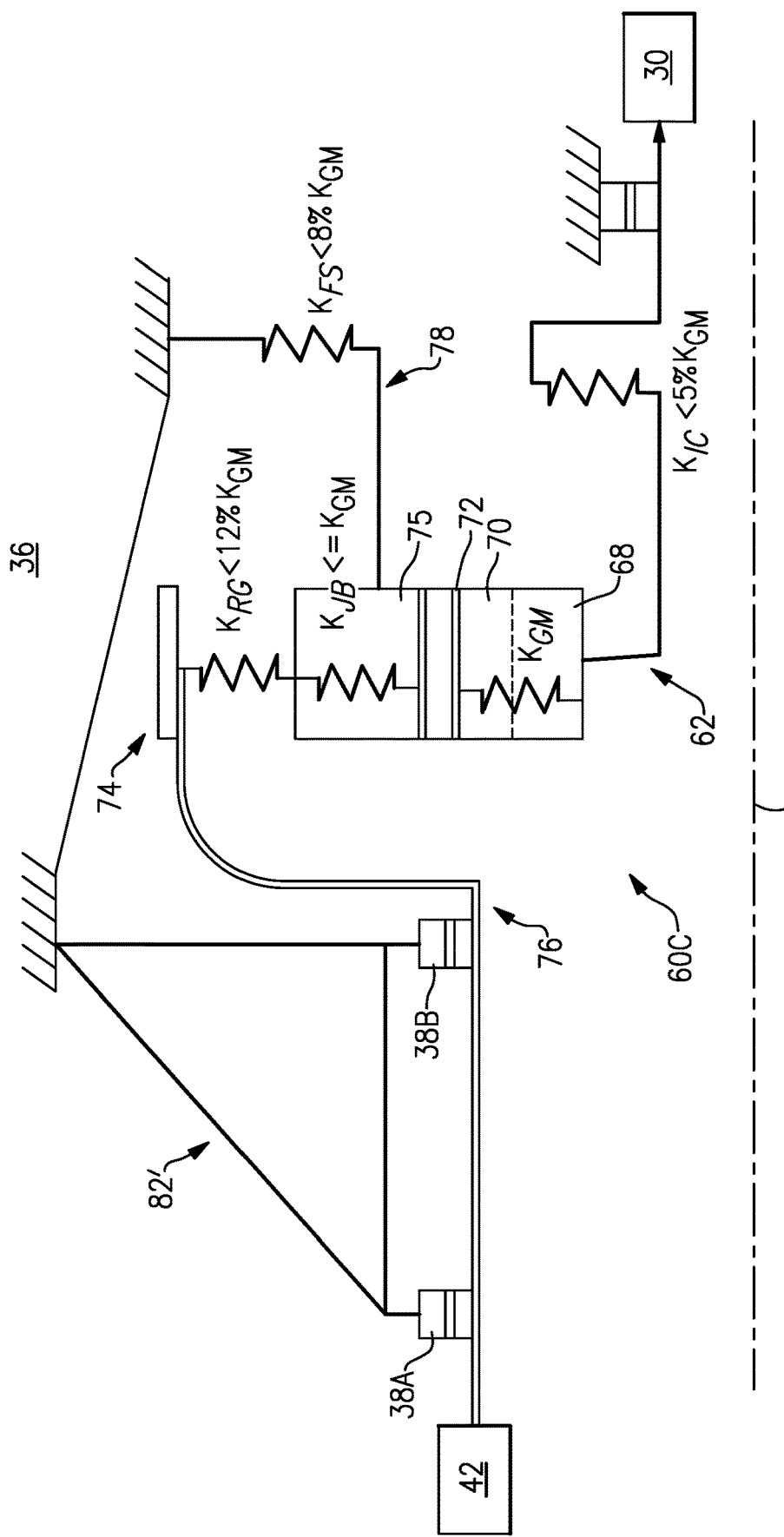
FIG. 5 is a schematic view of a flex mount arrangement for another non-limiting embodiment of a star system FDGS.

With reference to FIG. 5, the lateral stiffness relationship within a FDGS 60C itself (for a star system architecture) is schematically represented. The lateral stiffness (KIC) of an input coupling 62, a lateral stiffness (KFS) of a flexible support 78, a lateral stiffness (KRG) of a ring gear 74 and a lateral stiffness (KJB) of a planet journal bearing 75 are controlled with respect to a lateral stiffness (KGM) of a gear mesh within the FDGS 60.

In the disclosed non-limiting embodiment, the stiffness (KGM) may be defined by the gear mesh between the sun gear 68 and the multiple planet gears 70. The lateral stiffness (KGM) within the FDGS 60 is the referenced factor and the static structure 82' rigidly supports the fan shaft 76. That is, the fan shaft 76 is supported upon bearing systems 38A, 38B which are essentially rigidly supported by the static structure 82'. The lateral stiffness (KJB) may be mechanically defined by, for example, the stiffness within the planet journal bearing 75 and the lateral stiffness (KRG) of the ring gear 74 may be mechanically defined by, for example, the geometry of the ring gear wings 74L, 74R (FIG. 2).

In the disclosed non-limiting embodiment, the lateral stiffness (KRG) of the ring gear 74 is less than about 12% of the lateral stiffness (KGM) of the gear mesh; the lateral stiffness (KFS) of the flexible support 78 is less than about 8% of the lateral stiffness (KGM) of the gear mesh; the lateral stiffness (KJB) of the planet journal bearing 75 is less than or equal to the lateral stiffness (KGM) of the gear mesh; and the lateral stiffness (KIC) of an input coupling 62 is less than about 5% of the lateral stiffness (KGM) of the gear mesh.

Figure 6:
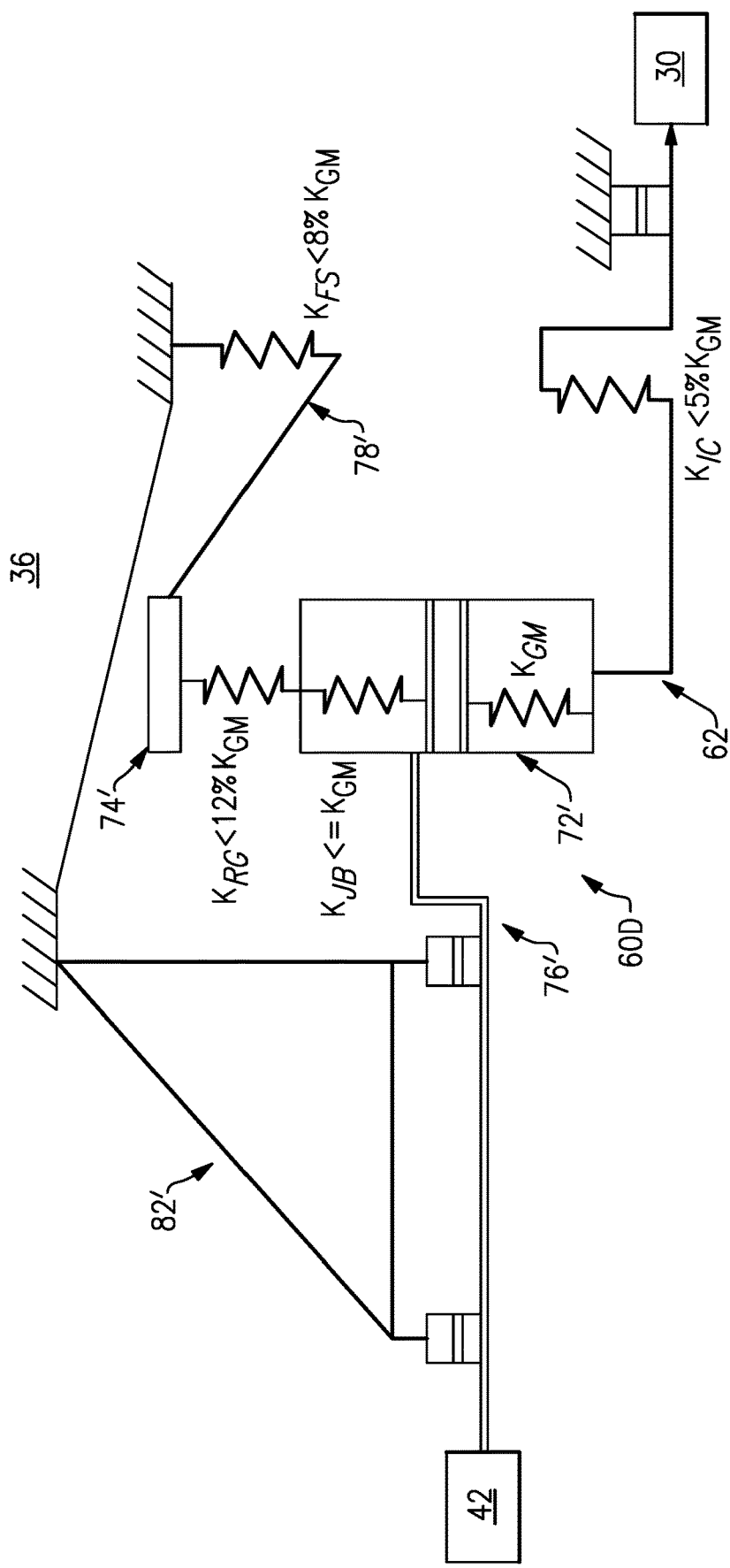
FIG. 6 is a schematic view of a flex mount arrangement for another non-limiting embodiment of a planetary system FDGS.

With reference to FIG. 6, another non-limiting embodiment of a lateral stiffness relationship within a FDGS 60D itself are schematically illustrated for a planetary gear system architecture, which otherwise generally follows the star system architecture of FIG. 5.

It should be understood that combinations of the above lateral stiffness relationships may be utilized as well. The lateral stiffness of each of structural components may be readily measured as compared to film stiffness and spline stiffness which may be relatively difficult to determine.

By flex mounting to accommodate misalignment of the shafts under design loads, the FDGS design loads have been reduced by more than 17% which reduces overall engine weight. The flex mount facilitates alignment to increase system life and reliability. The lateral flexibility in the flexible support and input coupling allows the FDGS to essentially 'float' with the fan shaft during maneuvers. This allows: (a) the torque transmissions in the fan shaft, the input coupling and the flexible support to remain constant during maneuvers; (b) maneuver induced lateral loads in the fan shaft (which may otherwise potentially misalign gears and damage teeth) to be mainly reacted to through the number 1 and 1.5 bearing support K-frame; and (c) both the flexible support and the input coupling to transmit small amounts of lateral loads into the FDGS. The splines, gear tooth stiffness, journal bearings, and ring gear ligaments are specifically designed to minimize gear tooth stress variations during maneuvers. The other connections to the FDGS are flexible mounts (turbine coupling, case flex mount). These mount spring rates have been determined from analysis and proven in rig and flight testing to isolate the gears from engine maneuver loads. In addition, the planet journal bearing spring rate may also be controlled to support system flexibility.

Figure 7:
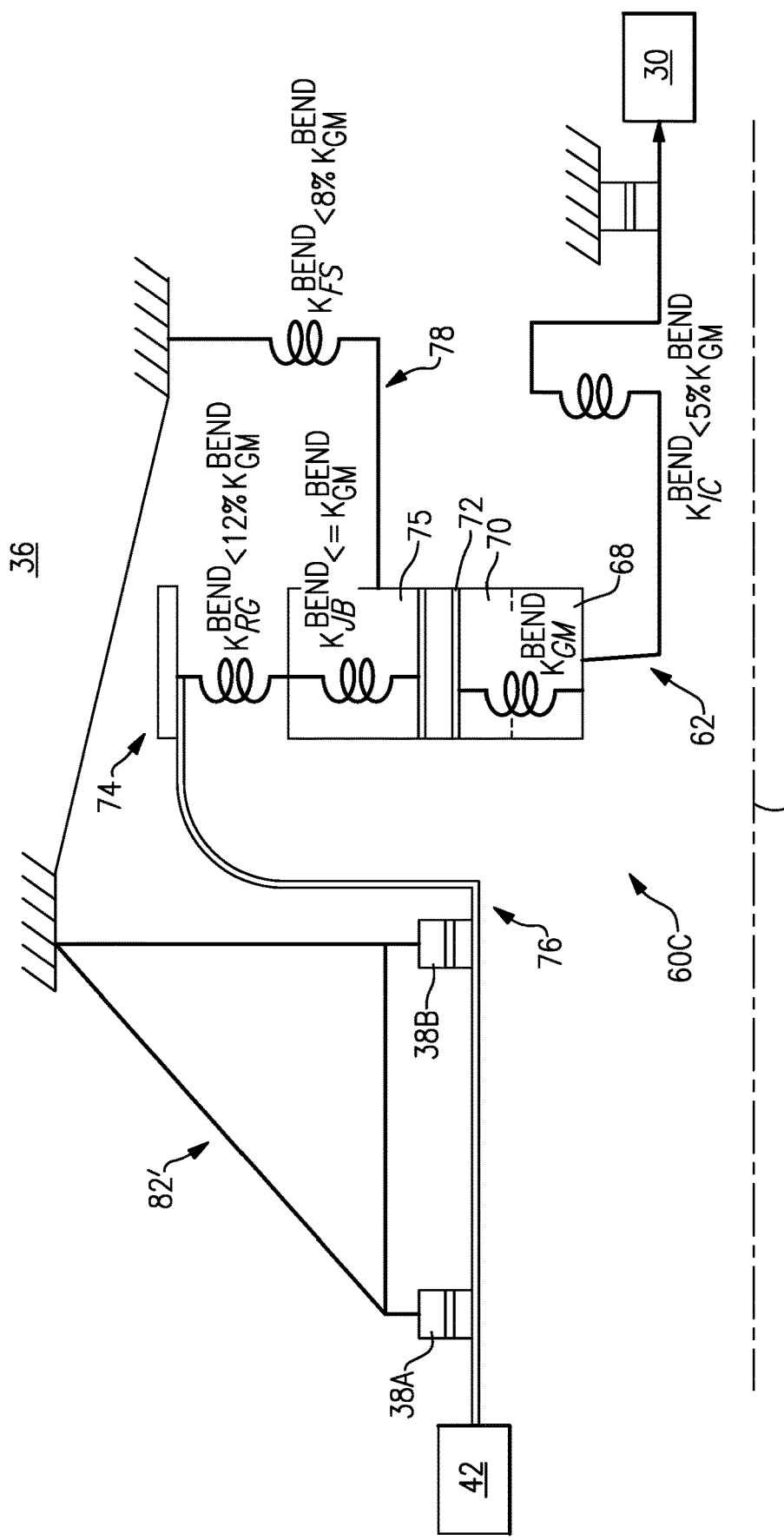
FIG. 7 is a schematic view of a flex mount arrangement for another non-limiting embodiment of a star system FDGS.

FIG. 7 is similar to FIG. 5 but shows the transverse stiffness relationships within the FDGS 60C (for a star system architecture). The transverse stiffness (KIC$^{BEND}$) of the input coupling 62, a transverse stiffness (KFS$^{BEND}$) of the flexible support 78, a transverse stiffness (KRG$^{BEND}$) of the ring gear 74 and a transverse stiffness (KJB$^{BEND}$) of the planet journal bearing 75 are controlled with respect to a transverse stiffness (KGM$^{BEND}$) of the gear mesh within the FDGS 60.

In the disclosed non-limiting embodiment, the stiffness (KGM$^{BEND}$) may be defined by the gear mesh between the sun gear 68 and the multiple planet gears 70. The transverse stiffness (KGM$^{BEND}$) within the FDGS 60 is the referenced factor and the static structure 82' rigidly supports the fan shaft 76. That is, the fan shaft 76 is supported upon bearing systems 38A, 38B which are essentially rigidly supported by the static structure 82'. The transverse stiffness (KJB$^{BEND}$) may be mechanically defined by, for example, the stiffness within the planet journal bearing 75 and the transverse stiffness (KRG$^{BEND}$) of the ring gear 74 may be mechanically defined by, for example, the geometry of the ring gear wings 74L, 74R (FIG. 2).

In the disclosed non-limiting embodiment, the transverse stiffness (KRG$^{BEND}$) of the ring gear 74 is less than about 12% of the transverse stiffness (KGM$^{BEND}$) of the gear mesh; the transverse stiffness (KFS$^{BEND}$) of the flexible support 78 is less than about 8% of the transverse stiffness (KGM$^{BEND}$) of the gear mesh; the transverse stiffness (KJB$^{BEND}$) of the planet journal bearing 75 is less than or equal to the transverse stiffness (KGM$^{BEND}$) of the gear mesh; and the transverse stiffness (KIC$^{BEND}$) of an input coupling 62 is less than about 5% of the transverse stiffness (KGM$^{BEND}$) of the gear mesh.

Figure 8:
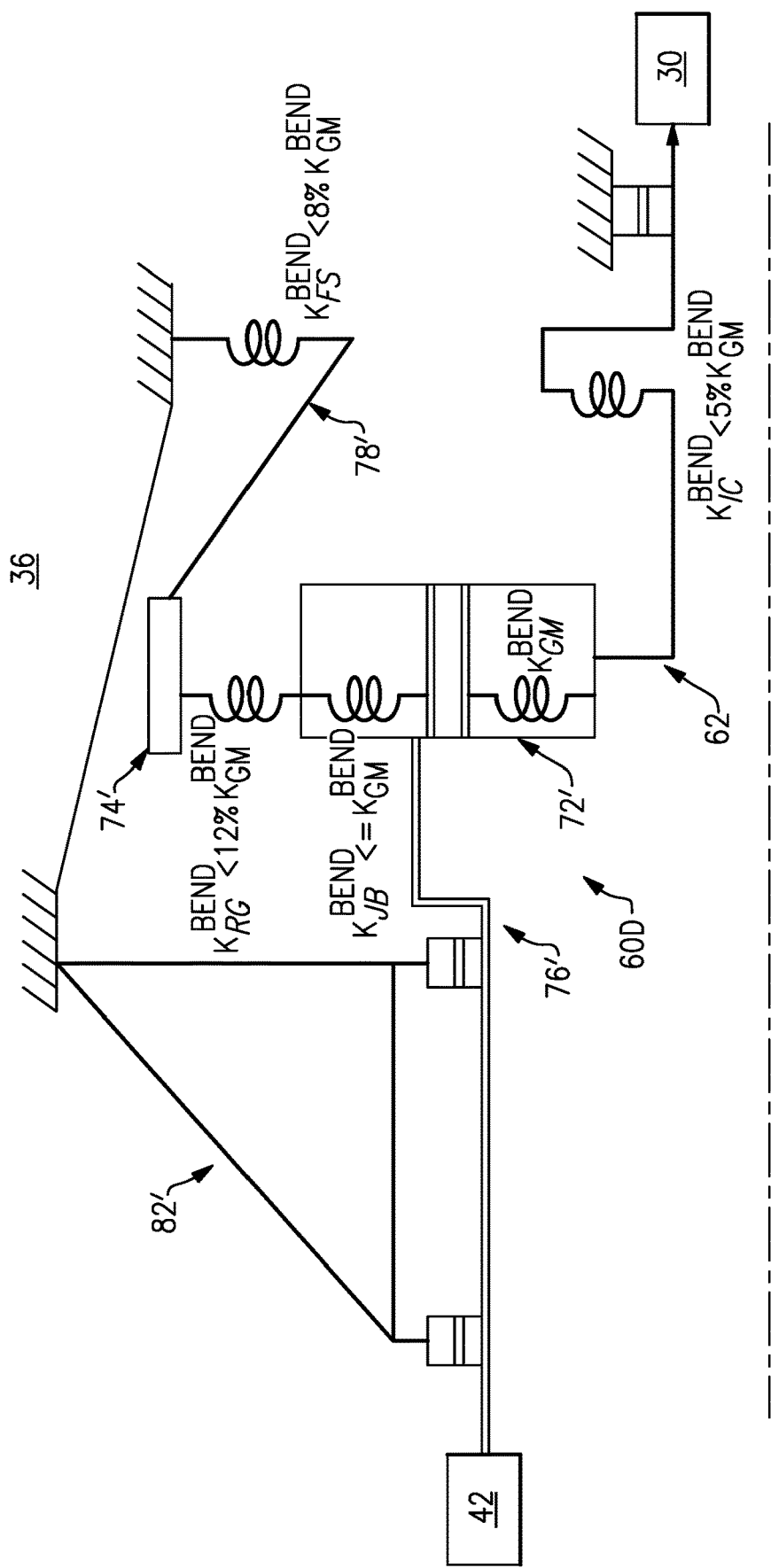
FIG. 8 is a schematic view of a flex mount arrangement for another non-limiting embodiment of a planetary system FDGS.

FIG. 8 is similar to FIG. 6 but shows the transverse stiffness relationship within the FDGS 60D for the planetary gear system architecture.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A geared architecture for a gas turbine engine comprising:
   a fan shaft driving a fan surrounded by an outer housing;
   a frame which supports said fan shaft, said frame defines a frame lateral stiffness;
   a plurality of gears in driving engagement with said fan shaft, said plurality of gears provide an epicyclic gear system, said epicyclic gear system includes a gear mesh defining a gear mesh lateral stiffness and a ring gear defining a ring gear lateral stiffness, wherein said ring gear lateral stiffness is less than 12% of said gear mesh lateral stiffness;
   a flexible support which supports said epicyclic gear system relative to a static structure and defines a flexible support lateral stiffness and a flexible support transverse stiffness; and
   an input coupling to said plurality of gears, said input coupling defines an input coupling lateral stiffness, wherein said flexible support lateral stiffness and said input coupling lateral stiffness are each less than about 11% of said frame lateral stiffness.

2. The geared architecture as recited in claim 1, wherein said frame is mounted to a static structure of said gas turbine engine.

3. The geared architecture as recited in claim 2, wherein said input coupling is mounted to a sun gear of said epicyclic gear system.

4. The geared architecture as recited in claim 3, wherein said fan shaft is mounted to said ring gear of said epicyclic gear system.

5. The geared architecture as recited in claim 4, wherein said plurality of gears form a star system.

6. The geared architecture as recited in claim 5, wherein said fan shaft is mounted to a planet carrier of said epicyclic gear system.

7. The geared architecture as recited in claim 4, wherein said flexible support lateral stiffness is less than about 8% of said gear mesh lateral stiffness.

8. The geared architecture as recited in claim 7, wherein said input coupling lateral stiffness is less than about 5% of said gear mesh lateral stiffness.

9. The geared architecture as recited in claim 4, wherein a lateral stiffness refers to a perpendicular direction with respect to an axis of rotation of said gas turbine engine and a transverse stiffness refers to a pivotal bending movement with respect to said axis of rotation of said gas turbine engine.

10. The geared architecture as recited in claim 1, wherein said frame is a K-frame bearing support, said K-frame bearing support supporting a bearing system that supports said fan shaft.

11. The geared architecture as recited in claim 1, wherein said flexible support lateral stiffness is less than 8% of said gear mesh lateral stiffness.

12. The geared architecture as recited in claim 11, wherein said input coupling lateral stiffness is less than 5% of said gear mesh lateral stiffness.

13. A geared architecture for a gas turbine engine comprising:
   a fan shaft driving a fan surrounded by an outer housing;
   a frame which supports said fan shaft, said frame defines a frame lateral stiffness;
   a plurality of gears in driving engagement with said fan shaft, said plurality of gears provide an epicyclic gear system, said epicyclic gear system includes a gear mesh that defines a gear mesh lateral stiffness and a gear mesh transverse stiffness and a ring gear defining a ring gear lateral stiffness and a ring gear transverse stiffness, wherein at least one of a ring gear lateral stiffness or a ring gear transverse stiffness is less than 12% of a respective one of said gear mesh lateral stiffness or said gear mesh transverse stiffness;
   a flexible support which supports said epicyclic gear system relative to a static structure and defines a flexible support lateral stiffness that is less than 8% of said gear mesh lateral stiffness; and
   an input coupling to said plurality of gears, said input coupling defines an input coupling lateral stiffness that is less than 5% of said gear mesh lateral stiffness, wherein said flexible support lateral stiffness and said input coupling lateral stiffness are each less than 11% of said frame lateral stiffness.

14. The geared architecture as recited in claim 13, wherein said flexible support lateral stiffness is less than about 8% of said gear mesh lateral stiffness.

15. The geared architecture as recited in claim 14, wherein said input coupling transverse stiffness is less than about 5% of said gear mesh transverse stiffness.

16. The geared architecture as recited in claim 15, wherein said flexible support supports a carrier of said epicyclic gear system.

17. The geared architecture as recited in claim 15, wherein said flexible support supports a ring gear of said epicyclic gear system.

18. The geared architecture as recited in claim 15, wherein a lateral stiffness refers to a perpendicular direction with respect to an axis of rotation of said gas turbine engine and a transverse stiffness refers to a pivotal bending movement with respect to said axis of rotation of said gas turbine engine.

19. A geared architecture for a gas turbine engine comprising:
   a fan shaft driving a fan surrounded by an outer housing;
   a frame which supports said fan shaft, said frame defines a frame lateral stiffness and a frame transverse stiffness;
   a plurality of gears in driving engagement with said fan shaft, said plurality of gears provide an epicyclic gear system, said epicyclic gear system includes a gear mesh that defines a gear mesh lateral stiffness and a ring gear defining a ring gear lateral stiffness, wherein a ring gear lateral stiffness is less than 12% of said gear mesh lateral stiffness;
   a flexible support which supports said epicyclic gear system relative to a static structure defines a flexible support lateral stiffness and said flexible support lateral stiffness is less than 11% of said frame lateral stiffness; and
   an input to said plurality of gears, said input defines an input transverse stiffness that is less than 11% of said frame transverse stiffness.

20. The geared architecture of claim 19, wherein said flexible support defines a flexible support transverse stiffness and said flexible support transverse stiffness and said input transverse stiffness are each less than 11% of said frame transverse stiffness.

21. The geared architecture of claim 20, wherein said input is an input coupling.

22. The geared architecture of claim 19, wherein said ring gear defines a ring gear transverse stiffness and said gear mesh defines a gear mesh transverse stiffness and said ring gear transverse stiffness is less than 12% of said gear mesh transverse stiffness.

23. A geared architecture for a gas turbine engine comprising:
- a fan shaft driving a fan surrounded by an outer housing;
- a frame which supports said fan shaft, said frame defines a frame lateral stiffness and a frame transverse stiffness;
- a plurality of gears in driving engagement with said fan shaft, said plurality of gears provide an epicyclic gear system, said epicyclic gear system includes a gear mesh that defines a gear mesh lateral stiffness and a ring gear that defines a ring gear lateral stiffness, wherein said ring gear lateral stiffness is less than 12% of said gear mesh lateral stiffness;
- a flexible support which supports said epicyclic gear system relative to a static structure defines a flexible support lateral stiffness that is less than 8% of said gear mesh lateral stiffness and less than 11% of said frame lateral stiffness; and
- an input to said plurality of gears, said input defines an input lateral stiffness that is less than 5% of said gear mesh lateral stiffness.

24. The geared architecture of claim 23, wherein said flexible support defines a flexible support transverse stiffness and said gear mesh defines a gear mesh transverse stiffness and said flexible support transverse stiffness is less than 8% of said gear mesh transverse stiffness.

25. The geared architecture of claim 23, wherein said flexible support defines a flexible support transverse stiffness and said input defines an input transverse stiffness and said flexible support transverse stiffness and said input transverse stiffness are each less than 11% of said frame transverse stiffness.

26. The geared architecture of claim 25, wherein said input is an input coupling.

* * * * *